United States Patent [19]

Louise et al.

[11] 3,947,546

[45] Mar. 30, 1976

[54] PROCESS FOR THE PURIFICATION OF GASEOUS EFFLUENTS

[75] Inventors: Jean Louise, Villejuif; Guy Senechal, Saint Cloud, both of France

[73] Assignee: l'Air Liquide, Societe Anonyme pour l'Etude et l'Exploitation des Procedes Georges Claude, Paris, France

[22] Filed: May 25, 1973

[21] Appl. No.: 364,034

[30] Foreign Application Priority Data

May 31, 1972 France .................................... 72.19426

[52] U.S. Cl. .................................. 423/242; 423/522
[51] Int. Cl.² .................................................. C01B 17/00
[58] Field of Search ........................... 423/242–244, 423/522

[56] References Cited
UNITED STATES PATENTS

| | | | |
|---|---|---|---|
| 1,279,110 | 9/1918 | Haslup | 423/52 |
| 2,021,936 | 11/1935 | Johnstone | 423/242 |
| 2,926,999 | 3/1970 | Tarbutton et al. | 423/242 |
| 3,330,649 | 7/1967 | Welsh | 423/52 |
| 3,574,562 | 4/1971 | Kawahata | 23/277 |
| 3,745,751 | 7/1973 | Zey | 423/242 |
| 3,836,630 | 9/1974 | Noguchi et al. | 423/242 |

*Primary Examiner*—Oscar R. Vertiz
*Assistant Examiner*—Gregory A. Heller
*Attorney, Agent, or Firm*—Browdy and Neimark

[57] ABSTRACT

There is described a process for the purification of gaseous effluents containing oxides of sulphur before discharge of the gaseous effluent into the atmosphere.

The process is carried out in at least two separate stages of oxidation using ozonised oxygen in the presence of a catalytic quantity of an ion of a transition metal and in a manner such that the ozonised oxygen does not contact the gaseous effluent. The ozone is generally employed in the proportion of one mole of ozone to 15 to 20 moles of impurity to be oxidised.

10 Claims, 1 Drawing Figure

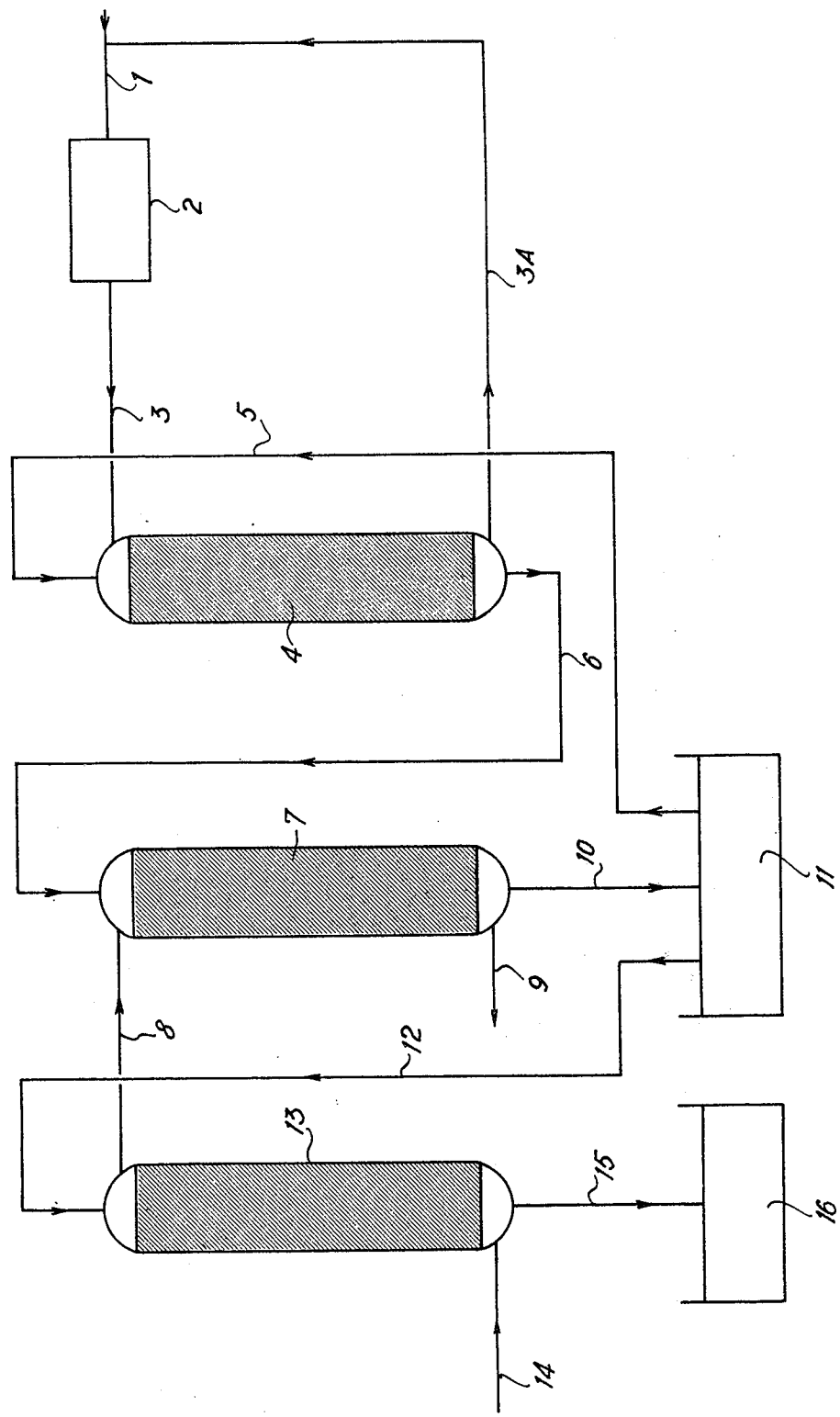

PROCESS FOR THE PURIFICATION OF GASEOUS EFFLUENTS

BACKGROUND OF THE INVENTION

This invention rlates to the purification, before discharge into the atmosphere, of gaseous effluents containing as impurities, oxides of sulphur, particularly sulphur dioxide. The toxic and pollutant properties of sulphur oxides (and certain nitrogen oxides) are such that these gases must be prevented from escaping into the atmosphere. In addition, it is economically desirable to recover these gases in the form of acids, more particularly sulphur oxides in the form of sulphuric acid. Many processes for purifying gaseous effluents in the form of, for example, smoke or fumes containing oxides of sulphur are known. Thus, it has been proposed to treat the smoke and fumes from steam generating stations, which smoke and fumes contain sulphur dioxide, either by catalysts by what is known as the dry method using vanadium salts or by injecting into the smoke or fumes ammonia whereby after a number of intermediate stages ammonium sulphate is formed. It has also been proposed to oxidise by means of ozonized oxygen the sulphur dioxide contained in such gaseous effluents, and to desulphurize the smoke or fumes by washing them with sulphuric acid containing ozonized oxygen, but it is found that in practice the smoke or fumes remain substantially unpurified even if a considerable quantity of ozone is employed. Thus, a disadvantage of the known processes for the treatment of gaseous effluents, e.g. smoke or fumes, by means of ozone is that they function with poor yields so that their operating cost is incompatible with economic requirements due to the excessive time taken up by the process or to the excessive consumption of ozone.

It is also known that salts of the transition metals, such as iron and manganese, are effective catalysts for the oxidation of sulphur dioxide with oxygen to form sulphur trioxide. U.S. Pat. Nos. 2,926,999 and 3,574,562, in the names of G. Tarbutton and M. Kawahata respectively, describe processes in which fumes containing sulphur oxides are treated in the presence of a manganese salt. The sulphuric acid is recovered in dilute form or in the form of ammonium sulphate which are products of limited value.

In other known processes, treatment of gaseous effluents with ozonized oxygen is carried out in a single column or in a single reactor, the ozonized oxygen being diluted in the fumes and the oxygen and ozone partial pressures being relatively low so that the manganese salts, which are used in the treatment, oxidize fairly slowly.

SUMMARY OF THE INVENTION

According to one aspect of the present invention there is provided a process for purifying a gaseous effluent containing, as impurity, sulphur dioxide which comprises oxidizing the sulphur dioxide with ozonized oxygen in two separate stages in the presence of a catalyst, wherein a. in the first stage a sulphuric acid solution with a concentration in the range 10 to 40% and containing a catalytic quantity of a salt of a transition metal is oxidized by means of ozonized oxygen containing from 1 to 3% of ozone, the oxygen remaining after said first stage being recycled for ozonization;

b. in the second stage the sulphur dioxide in the gaseous effluent is oxidized to sulphur trioxide by bringing the gaseous effluent containing the sulphur dioxide into contact with the previously oxidized solution of sulphuric acid, the period of contact between the gaseous effluent and the oxidized sulphuric acid being in the range of from about 0.5 to about 3 seconds, part of the sulphuric acid which has lost its oxidizing potential after desulphurization of the gaseous effluent being recycled into the first oxidation stage and another part of the sulphuric acid which has lost its oxidizing potential being concentrated by counter-current heat exchange with the gaseous effluent before the latter has been desulphurized.

By means of the process of the invention it is possible to desulphurize gaseous effluents in a satisfactory manner, whereby the sulphur dioxide contained therein may be eliminated to an extent of from 90 to 95%, with a low consumption of ozone and oxygen.

Moreover, the process makes it possible to recover a high-quality by-product, the sulphur dioxide eliminated from the gaseous effluent being recovered in the form of a marketable concentrated sulphuric acid. The process of the invention is applicable to any residual gaseous effluent containing oxides of sulphur. Advantageously, the process of the present invention is used for the purification of smoke or fumes produced in thermal enclosures having cold or hot walls and containing oxides of sulphur emanating from the oxidation of the sulphur contained in petroleum fuels employed in combustion, and in some cases also containing oxides emanating from the combustion itself.

In accordance with the process of the present invention, the gaseous effluent containing, as impurities, oxides of sulphur, more particularly sulphur dioxide, is purified by oxidation in two separate stages in the presence of a catalyst. The two-stage oxidation affords an advantage over the prior art; on the one hand, oxidation takes place in a column of a sulphuric acid solution containing the catalyst and, on the other hand, this solution oxidizes the $SO_2$ contained in the fumes in a second column. In this way, the oxygen and gaseous effluent circuits are independent, so that the unused oxygen can be recycled.

In the first stage, there is oxidized dilute sulphuric acid with a concentration ranging from 10 to 40%, which contains a catalytic quantity of a salt of a transition metal, for example manganese or iron, by means of ozonized oxygen, containing from 1 to 3% of ozone, the oxygen not utilized in the oxidation of the solution and of the catalyst being recycled in the ozonization. In the separate, second stage, the sulphur dioxide is oxidized to sulphur trioxide by bringing the gaseous effluent into contact with the previously oxidized solution, the period of contact between the gas and the liquid being of the order of seconds, generally between 0.5 and 3 seconds, and a part of the dilute sulphuric acid, which has lost its oxidizing potential after desulphurization of the gaseous effluent, is directly recycled to the top of the first oxidation stage. Another part of the sulphuric acid which has lost its oxidizing potential is concentrated, preferably to a concentration of more than 90%, by counter-current heat exchange with the gaseous effluent before desulphurization of the latter.

It has been observed that the process for purifying gaseous effluents by washing with sulphuric acid in the presence of ozonized oxygen is industrially profitable only provided that two conditions are observed in its application: thus, the presence of a catalyst in the sulphuric acid is necessary and the oxidations of this catalyst and of the sulphur dioxide must be carried out in separate apparatus.

DESCRIPTION OF THE PREFERRED EMBODIMENTS

In one embodiment of the process according to the invention, the quantity of ozone employed is 1 mole to from 15 to 20 moles of sulphur dioxide. This condition renders the process compatible with the economic requirements of industry.

In a preferred embodiment of the invention, the catalyst is manganese sulphate, which is employed in the proportion of from 0.5 to 5 g per liter of sulphuric acid, and more particularly with an optimum content of about 1 g per litre. The temperature of the gaseous effluent entering the desulphurization installation is in the range of from 100° to 150°C, while the temperature of the previously oxidizing acid solution, containing the catalyst, is in the range of from 30° to 80°C.

The contact between the gaseous effluent and the oxidized acid solution during the stage of desulphurisation by oxidation may advantageously be effected in co-current, but it may also be carried out in counter-current.

In a modified embodiment of the invention, the gaseous effluent is freed from the solid particles by independent bubbling of the effluent through an acid liquid, before desulphurization thereof.

In order to recover, as a by-product, an acid of sufficient concentration to be directly marketable, it is necessary to concentrate the sulphuric acid which has lost its oxidizing potential, for which purpose the dilute acid is passed in counter-current, preferably through a column, with the hot gaseous effluent entering the installation. The gaseous effluent becomes charged with water, and the sulphuric acid becomes concentrated, and 90–95% of the acid is recovered at the bottom of the column. When the acid is of sufficiently high concentration, the greater part of the catalyst entrained in the sulphuric acid can be separated by crystallization and decantation at ambient temperature. The recovered catalyst is recycled and reintroduced into the dilute sulphuric acid solution before oxidization by means of ozonization oxygen.

The rate of flow of the gaseous effluent in relation to that of the sulphuric acid, during the desulphurization phase, is advantageously chosen to lie in the range 1000 to 50, preferably between 300 and 100, to 1.

According to another aspect of the present invention there is provided an installation for carrying out the aforesaid process, which installation essentially comprises three enclosures, preferably of the column type. One of these enclosures promotes the contact between the dilute sulphuric acid solution containing the catalyst and the ozonized oxygen, while the second enclosure promotes the contact between the gaseous effluent to be purified and the previously oxidized sulphuric acid solution, and the third enclosure promotes the contact between part of the sulphuric acid which has lost its oxidizing potential and the hot gaseous effluent before desulphurization. The installation also comprises means for ozonizing the oxygen, and means for the introduction and recycling of the liquids and the gases, and storage means.

The following Example illustrates the invention.

EXAMPLE

The accompanying drawing shows diagrammatically the installation used. The installation comprises three PYREX glass columns, each packed with Raschig rings of the same material. Each of the columns used had a length of 1 meter and a diameter of 100 mm, and the Raschig rings had a diameter of 10 mm. The circulation of the liquids through the three columns was carried out by means of glass pumps. (Alternatively, there may be used plate-type columns).

Oxygen circulates through a duct 1 and is ozonizing in an ozoniser 2. The ozonized oxygen, containing from 1 to 3% of ozone, is carried through a duct 3 and introduced into the upper part of an oxidation column 4. Sulphuric acid solution, which has a concentration of 20% by weight and contains 1 g of manganese sulphate per liter, circulates through a duct 5 and is fed to the top of the oxidation column 4, so that a regular distribution is obtained. Oxidation of the manganese sulphate and ozonization of the acid are effected in the column 4.

After the ozonized oxygen has passed through the column 4, the unconsumed oxygen (which constitutes the greater part) is sent back to the ozoniser through a duct 3A, the remainder of the oxygen required being supplied from an external source.

The oxidized sulphuric acid solution withdrawn from the bottom of the column 4 is sent through a duct 6 to the upper part of a desulphurization column 7 in co-current flow with the gaseous effluent coming from a duct 8. The gaseous effluent is smoke emanating from the combustion of heavy fuels containing between 1.5 and 6% of sulphur. The concentration of the $SO_2$ in the smoke is in the range of from 1000 to 3500 p.p.m. by volume (parts per million by volume).

In the desulphurization column 7, the greater part of the sulphur dioxide contained in the smoke is oxidized to sulphur trioxide, which is in turn hydrated to sulphuric acid. The smoke leaving the lower part of the column 7 through duct 9 contains substantially no sulphur dioxide.

The fumes and the acid circulate in co-current through the desulphurization column 7 the ratio of the rates of flow of the fumes to the acid preferably being of the order of 100:1 to 50:1. This optimum value applies to the particular type of column chosen, because it depends upon the time of contact and therefore upon the dimensions of the column. With the installation being described, the time of contact between the gas and the liquid is 1 second. The temperature of the fumes entering the desulphurization column is 100°–150°C, and the temperature of the acid is 30°–80°C.

The sulphuric acid solution recovered at the bottom of the column 7 by extraction through a duct 10 is passed into a storage receptacle 11. Part of this sulphuric acid solution which has lost its oxidizing potential is re-injected through the duct 5 into the top of the column 4.

Another part of the recovered sulphuric acid solution is passed through a duct 12 into the top of an acid concentration column 13 in counter-current with the smoke to be purified, which is introduced through a duct 14. The smoke arriving at a sufficiently high temperature, i.e. in the range 200°–300°C, in the installation becomes charged with water and the acid becomes concentrated, so that from 90 to 95% sulphuric acid is recovered at 15 from the bottom of the column 13. The concentrated sulphuric acid is stored at 16. Part of the manganese sulphate contained in the acid is recovered by crystallization and decantation at ambient temperature. The recovered catalyst can then be recycled.

The quantity of sulphur dioxide contained in the smoke is measured on entering and leaving the column 7.

The effectiveness of the process can be demonstrated by considering two ratios:

$$TE = \frac{SO_2 \text{ (inlet)} - SO_2 \text{ (outlet)}}{SO_2 \text{ (inlet)}} \times 100 = \text{percentage purification}$$

$$R_o = \frac{\text{moles of } SO_2 \text{ eliminated}}{\text{moles of } O_3 \text{ introduced}} = \text{oxidation efficiency}$$

The percentage purification and the oxidation efficiency are $TE = 90 - 95\%$ for $R_O = 15 - 20$.

The results obtained illustrate the advantages of the process, showing a rapid oxidation of the catalyst (manganese salts contained in the sulphuric acid), the possibility of recycling the unused oxygen and the production of an 80% sulphuric acid which can be directly marketed.

We claim:

1. A process for purifying gaseous effluent containing sulfur dioxide, comprising the steps of:
   a. oxidizing, in a first stage, by means of ozonized oxygen containing from 1–3% ozone, a solution consisting essentially of sulphuric acid with a concentration in the range of 10–40% containing an amount of a salt of iron or manganese sufficient to catalyze the oxidation of sulphur dioxide;
   b. recycling the oxygen remaining after step (a) for ozonization;
   c. oxidizing, in a second stage, the greater portion of the sulphur dioxide into sulphur trioxide by bringing the gaseous effluent containing sulphur dioxide into contact with the oxidized solution of sulphuric acid from step (a), the rate of flow of the gaseous effluent to that of the oxidized solution of sulphuric acid being between 1000:1 and 50:1, and the period of contact between the gaseous effluent and the oxidized sulphuric acid being in the range of from about 0.5 to about 3 seconds;
   d. recycling part of the sulphuric acid which has lost its oxidizing potential and which remains after step (c) into the oxidizing step (a);
   e. concentrating to 90–95% another part of the sulphuric acid which has lost its oxidizing potential and which remains after step (c) by counter-current heat exchange with the gaseous effluent before the latter has been desulphurized;
   f. separating the greater part of the catalyst entrained in the concentrated sulphuric acid after said step (e) by crystallization and decantation at ambient temperature: and
   g. recycling said catalyst to the sulphuric acid used in said step (a); and
   wherein the amount of ozone employed in said ozonized oxygen is 1 mole per 15–20 moles of sulphur dioxide.

2. A process for purifying a gaseous effluent according to claim 1, wherein the catalyst is manganese sulphate present in solution in sulphuric acid in the proportion of from 0.5 to 5 g of manganese sulphate per liter.

3. A process for purifying a gaseous effluent according to claim 2, wherein the sulphuric acid solution has a concentration of about 20% and contains about 1 g of manganese sulphate per liter of sulphuric acid solution.

4. A process for purifying a gaseous effluent according to claim 1, wherein the temperature of the gaseous effluent entering said step (c) ranges from 100° to 150°C and wherein the temperature of the previously oxidized acid solution entering said step (c) ranges from 30° to 80°C.

5. A process for purifying a gaseous effluent according to claim 1 wherein, in the said step (c), the gaseous effluent and the acid solution are brought into co-current contact with each other.

6. A process for purifying a gaseous effluent according to claim 1 wherein, in said step (c), the gaseous effluent and the acid solution are brought into counter-current contact with each other.

7. A process for purifying a gaseous effluent in accordance with claim 1, further including the step of:
   h. freeing the gaseous effluent from solid particles by bubbling through an acid liquid, prior to said step (c).

8. A process according to claim 1, wherein the gaseous effluent comprises the combustion products of a petroleum fuel.

9. A process for purifying a gaseous effluent in accordance with claim 1, wherein, during said step (c), the rate of flow of the gaseous effluent relative to that of the sulphuric acid is between 300:1 and 100:1.

10. A process for purifying a gaseous effluent in accordance with claim 1, wherein, during said step (c), the rate of flow of the gaseous effluent relative to that of the sulphuric acid is between 100:1 and 50:1.

* * * * *